United States Patent [19]
Smith et al.

[11] Patent Number: 6,095,559
[45] Date of Patent: Aug. 1, 2000

[54] CHEMICAL COOLING OF AIRBAG INFLATION GASES

[75] Inventors: Bradley W. Smith, Ogden; Alan R. Larsen, Layton, both of Utah

[73] Assignee: Autoliv ASP, Inc., Ogden, Utah

[21] Appl. No.: 09/121,570

[22] Filed: Jul. 23, 1998

[51] Int. Cl.⁷ .................................................. B60R 21/26
[52] U.S. Cl. .......................................... 280/741; 102/704
[58] Field of Search .................................... 280/736, 741; 102/530, 531, 704

[56] References Cited

U.S. PATENT DOCUMENTS

| | | |
|---|---|---|
| 3,273,332 | 9/1966 | Poudrier . |
| 3,305,319 | 2/1967 | Kowalick et al. . |
| 3,515,518 | 6/1970 | Halstead et al. . |
| 3,647,393 | 3/1972 | Leising et al. . |
| 3,692,495 | 9/1972 | Schneiter et al. . |
| 3,733,180 | 5/1973 | Heineck et al. . |
| 3,773,351 | 11/1973 | Catanzarite . |
| 3,778,084 | 12/1973 | Sutherland et al. . |
| 3,785,149 | 1/1974 | Timmerman . |
| 3,862,866 | 1/1975 | Timmerman et al. . |
| 3,897,285 | 7/1975 | Hamilton et al. . |
| 3,901,747 | 8/1975 | Garner . |
| 3,902,934 | 9/1975 | Timmerman . |
| 3,934,984 | 1/1976 | Marlow et al. . |
| 3,950,263 | 4/1976 | Fukuma et al. . |
| 3,958,949 | 5/1976 | Plantif et al. . |
| 3,986,456 | 10/1976 | Doin et al. . |
| 4,066,415 | 1/1978 | Kasama et al. . |
| 4,152,899 | 5/1979 | Herrick . |
| 4,244,758 | 1/1981 | Garner et al. . |
| 4,246,051 | 1/1981 | Garner et al. . |
| 4,291,755 | 9/1981 | Minto . |
| 4,305,908 | 12/1981 | Anisimov et al. . |
| 4,403,643 | 9/1983 | Minto . |
| 4,461,339 | 7/1984 | Sizmann . |
| 4,484,617 | 11/1984 | Sizmann . |
| 4,698,107 | 10/1987 | Goetz et al. . |
| 4,718,242 | 1/1988 | Yamauchi et al. . |
| 4,752,310 | 6/1988 | Maier-Laxhuber et al. . |
| 4,789,562 | 12/1988 | Stiffler . |
| 4,806,180 | 2/1989 | Goetz et al. . |
| 4,930,319 | 6/1990 | Bee et al. . |
| 5,261,241 | 11/1993 | Kitahara et al. . |
| 5,620,205 | 4/1997 | Lauritzen et al. . |
| 5,682,013 | 10/1997 | Smith et al. . |

*Primary Examiner*—Paul N. Dickson
*Attorney, Agent, or Firm*—Sally J. Brown

[57] ABSTRACT

Assemblies and methods are provided for cooling a hot gas utilizing a solid chemical coolant wherein the mass of coolant is maintained to avoid the creation of flow passageways, channels or the like therethrough which may otherwise serve to avoid or reduce either or both the amount and extent of contact between coolant and hot gas.

20 Claims, 9 Drawing Sheets

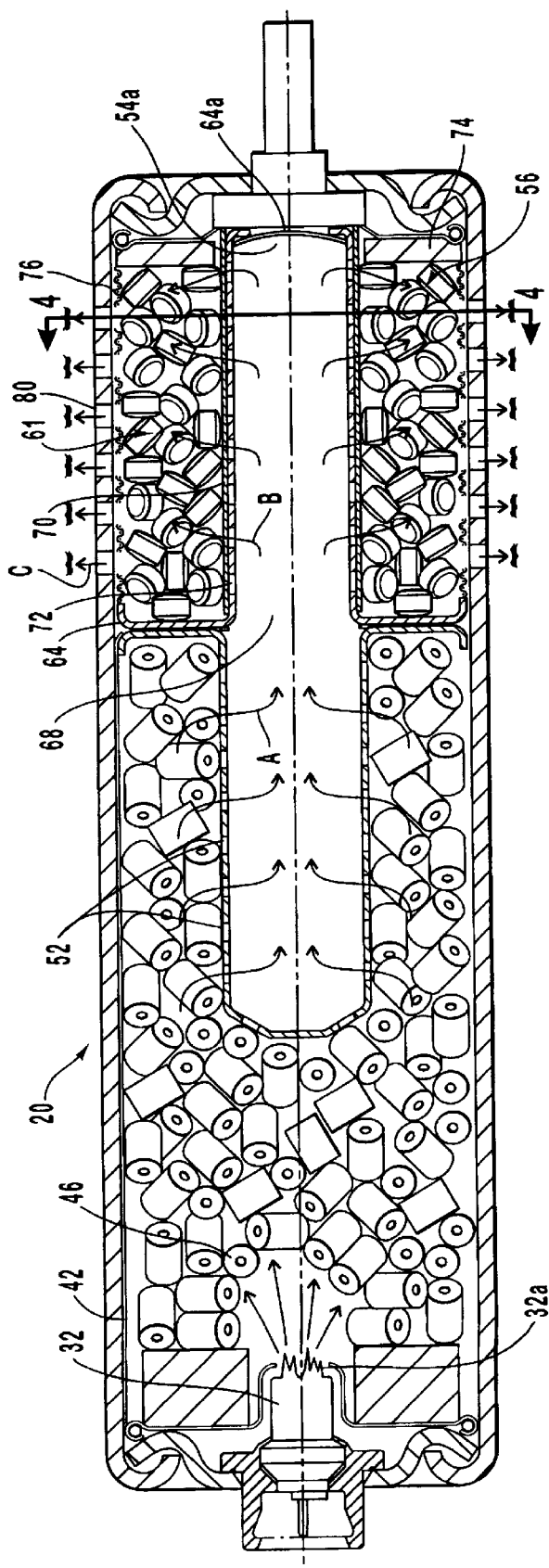
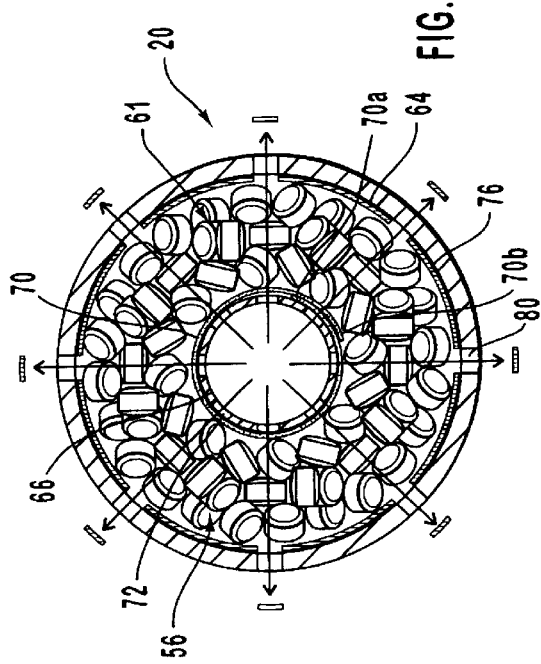
FIG. 3
FIG. 4

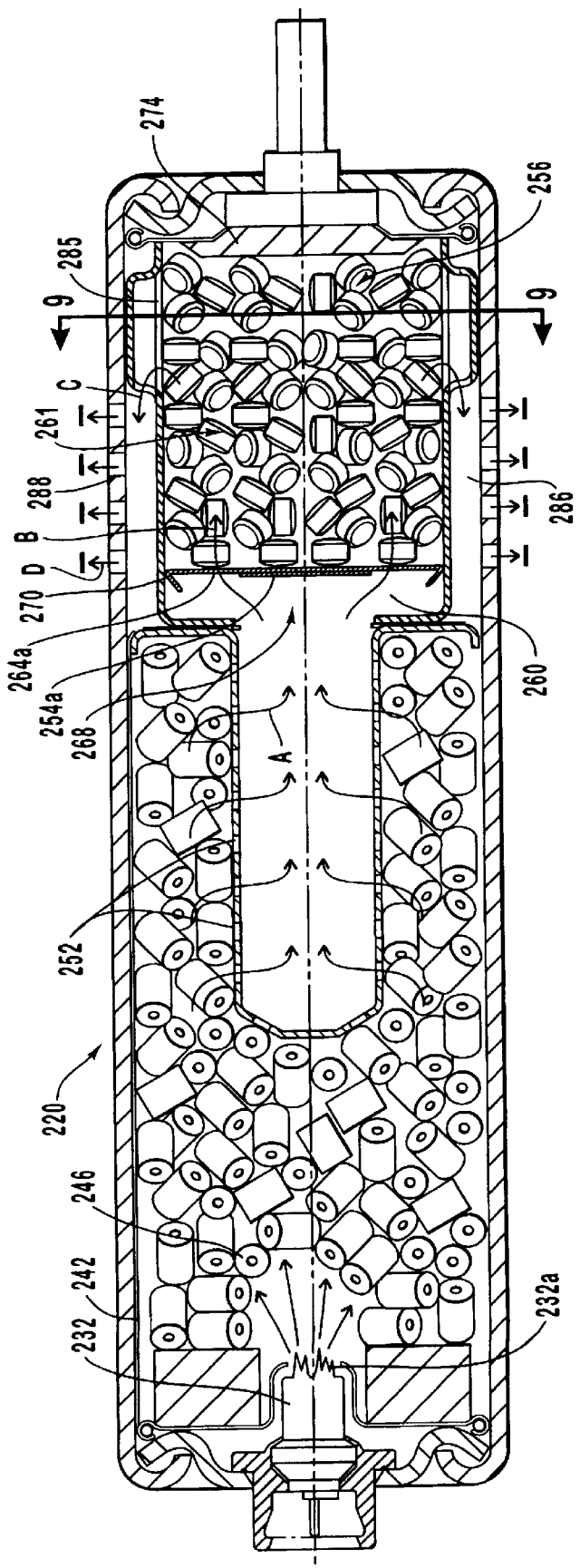
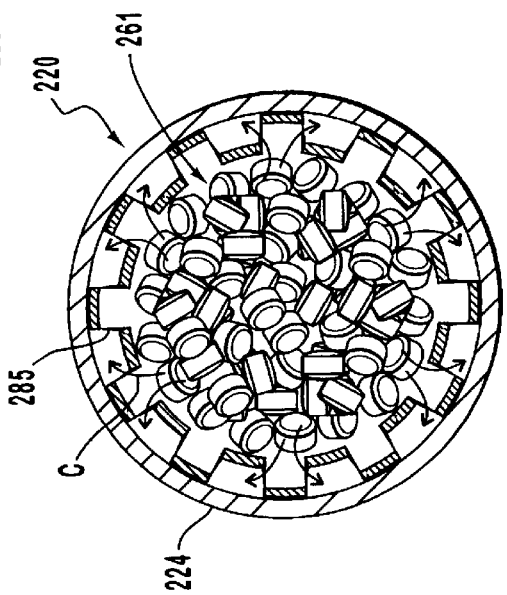
FIG. 8
FIG. 9

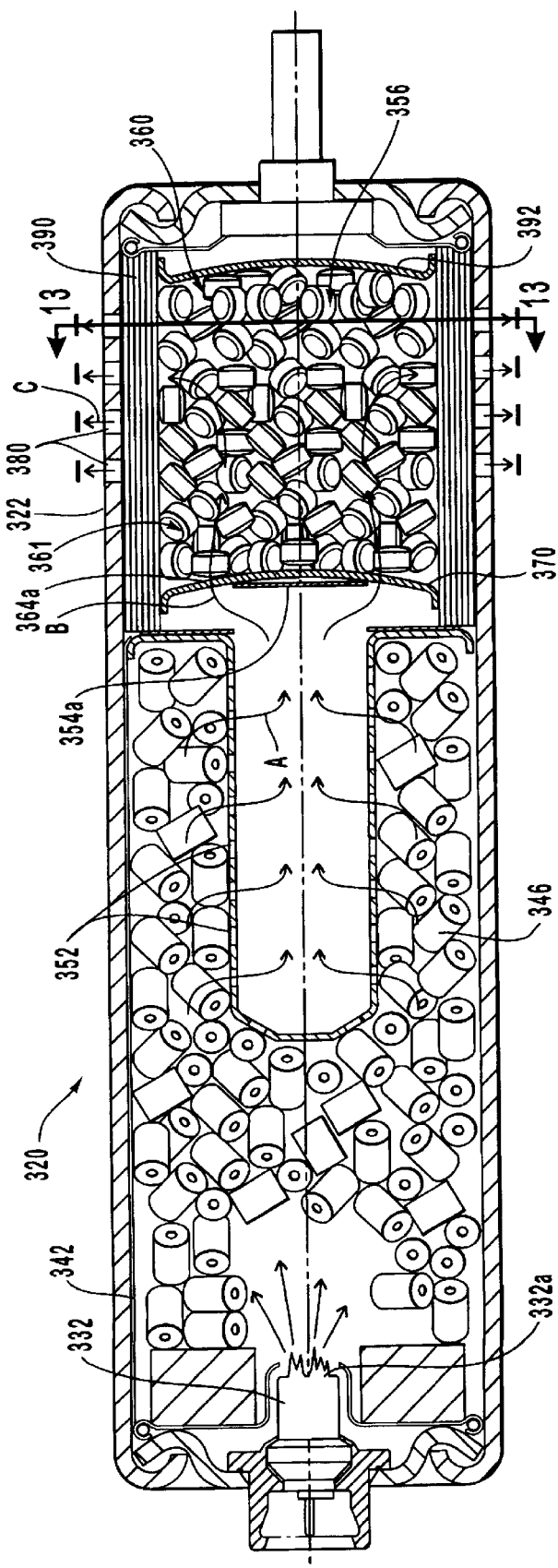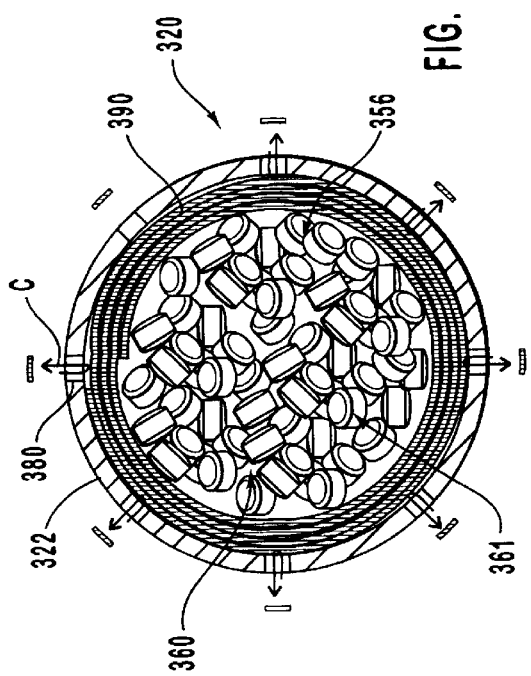
FIG. 12
FIG. 13

CHEMICAL COOLING OF AIRBAG INFLATION GASES

BACKGROUND OF THE INVENTION

This invention relates generally to the treatment of gases and, more particularly, to the treatment, such as by chemical cooling, of gases such as those produced or generated for inflation of inflatable devices such as airbag cushions.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

While many types of inflator devices have been disclosed in the art for use in the inflating of one or more inflatable restraint system airbag cushions, inflator devices which rely on the combustion of a pyrotechnic, fuel and oxidizer combination or other form of gas generant to produce or at least in part form the inflation gas issuing forth therefrom have been commonly employed in conjunction with vehicular inflatable restraint airbag cushions.

Usually, the combustion processing occurring in such inflator devices has associated therewith the generation or production of significant quantities of heat. As will be appreciated, it may be desired or preferred to generally limit the temperature of the inflation gas and which gas may, intentionally or inadvertently, exit from the associated inflatable device, such as either during or subsequent to the inflation thereof.

In general, the ability to design airbag inflator devices to cool the generated gases to any particularly selected temperature has been rather limited. For example, it is relatively common for modern airbag inflator devices to incorporate a form of mechanical cooling means such as through the conduction of heat into a heat sink, which typically has high thermal conductivity as well as large surface area and mass with which to absorb heat. In particular, it is common for modern inflator devices to include an internal screen pack such as to cool the generated gas and to filter or otherwise remove solid residue remaining from the combustion process. Consequently, the final temperature of the gas from such a device is typically dependent on the gas temperature of the combustion process, the heat transfer to the inflator housing and associated screen or filter materials and the gas expansion into the associated airbag cushion.

Many factors may serve or act to control or limit the amount of cooling which may be realized through the use of such mechanical cooling means. For example, the amount of cooling realizable through such use of a mechanical cooling means will typically be limited by factors such as the length of time the generated gas is in contact with the cooling media as well as the physical properties or parameters, such as mass, surface area, melt temperature and thermal conductivity of the cooling media.

At the present time, sodium azide is a commonly accepted and used gas generating material. While the use of sodium azide meets current industry specifications, guidelines and standards, such use may involve or raise potential handling, supply and disposal concerns. As a result, the development and use of other suitable gas generant materials has been pursued. Thus, efforts have been directed to the development of azide-free pyrotechnics for use in such inflator device applications.

At least certain of such azide-free pyrotechnic materials burn at significantly higher temperature than conventional azide-based pyrotechnics. For example, whereas commonly-used airbag inflator device azide pyrotechnics form gaseous products in a temperature range of about 1400 K to about 1500 K, the gaseous products associated with such azide-free pyrotechnics may more typically be formed at a temperature of about 1700 K to about 2500 K and, more commonly, at a temperature of about 1700 K to about 1900 K. In fact, the higher temperatures associated with such azide-free pyrotechnics are often at or above the melt temperature of many of the mechanical cooling media materials commonly associated with current airbag inflator devices. Consequently, the further development and use of more efficient pyrotechnics, such as at least certain azide-free pyrotechnics, has been somewhat limited or hampered by limitations in the abilities of conventional inflator devices and common mechanical cooling media materials to accept such higher combustion temperatures.

Thus, there is a need and a demand for assemblies and processing techniques which can provide an alternative to such mechanical cooling of gases and such as may more easily be adapted for use in conjunction with the cooling of higher temperature gases.

In the past, certain inflator devices have used or attempted to use a form of chemical coolant either alone or in conjunction with mechanical cooling of generated gases. Such chemical cooling has typically relied on the use of one or more endothermically reactable chemical coolant materials with which hot generated gases come into contact such that the hot generated gases are cooled.

A significant limitation to the more effective and increased use of such endothermically reactable chemical coolants has been that such coolants tend to experience significant shrinkage or reduction in size upon reaction. In practice, such shrinkage or size reduction may amount to a total reduction of 50 percent or more. As a result of experiencing such size reduction, a body of such a chemical coolant such as contained within an inflator device may undesirably form channels or other form of passageways therethrough which may serve to limit and minimize contact between the hot gases and the chemical coolant and thus reduce or limit the effective of the chemical coolant.

Thus, there is a need and a demand for assemblies and processing techniques which can permit either or both the more widespread or efficient use of such chemical coolants such as by minimizing or avoiding the possibly detrimental effects of size reduction or gas passage channel formation such as associated with the use of a body of such a chemical coolant.

SUMMARY OF THE INVENTION

A general object of the invention is to provide improved assemblies and methods for cooling a hot gas, as well as improved inflator assemblies.

A more specific objective of the invention is to overcome one or more of the problems described above.

In accordance with one embodiment, the invention provides an assembly for use in cooling a hot gas. The assembly includes a coolant chamber containing a solid mass of a chemical coolant. The coolant chamber includes at least one gas entrance opening and at least one gas exit orifice. The chemical coolant is endothermically reactable with the hot gas to cool the hot gas and to form at least one gaseous endothermic reaction product with the mass of the chemical coolant being reduced when a sufficient quantity of heat is absorbed thereby. The assembly also includes a member interposed between the at least one gas entrance opening and the chemical coolant solid mass. The member is permeable to the hot gas to permit passage of the hot gas therethrough to contact the chemical coolant solid mass. The member is also movable to cooperate with the coolant chamber to maintain a compressive force on the chemical coolant as the chemical coolant endothermically reacts and the mass thereof is reduced. The cooled hot gas formed within the assembly is passed from the coolant chamber through the at least one gas exit orifice.

The prior art fails to provide as efficient and effective as desired assembly and processing technique alternative to mechanical cooling of gases. The prior art also fails to provide assemblies and processing techniques which permit either or both the more widespread or efficient use of such chemical coolants such as by minimizing or avoiding the possibly detrimental effects of size reduction or gas passage channel formation such as associated with the use of a body of such a chemical coolant.

The invention further comprehends an inflator assembly. The inflator assembly includes a gas generating chamber and a chemical coolant assembly. Within the gas generating chamber there is produced, formed or generated a hot gas. The gas generating chamber has at least one gas exit opening. Upon actuation, the gas generating chamber emits generated hot gas through the at least one gas exit opening.

The chemical coolant assembly is in fluid communication with the generated hot gas emitted from the gas generating chamber. The chemical coolant assembly includes a coolant chamber containing a solid mass of a chemical coolant. The coolant chamber has or includes at least one gas entrance opening and at least one gas exit orifice. The chemical coolant is endothermically reactable with the generated hot gas to cool the generated hot gas and to form at least one gaseous endothermic reaction product, with the mass of the chemical coolant being reduced when a sufficient quantity of heat is absorbed thereby.

The chemical coolant assembly also includes a member interposed between the at least one gas entrance opening and the chemical coolant solid mass. The member is permeable to the generated hot gas to permit passage of the generated hot gas therethrough to contact the chemical coolant solid mass. The member also is movable to cooperate with the coolant chamber to maintain a compressive force on the chemical coolant as the chemical coolant endothermically reacts and the mass thereof is reduced. The cooled generated hot gas is passed from the coolant chamber through the at least one gas exit orifice.

The invention still further comprehends a method of cooling a hot gas. In accordance with one embodiment of the invention, such method include a step of passing a quantity of hot gas through a permeable member and into contact with a solid mass of a chemical coolant contained within a coolant chamber. The chemical coolant is endothermically reactable with the hot gas to cool the hot gas and to form at least one gaseous endothermic reaction product, with the size of the chemical coolant solid mass being reduced when a sufficient quantity of heat is absorbed thereby.

Such method further includes a step of compressing the solid mass of chemical coolant between the movable member and the coolant chamber as the size of the chemical coolant solid mass is reduced.

As used herein, references to an object such as a member, wall or other such component as being "permeable" or the like and such as more particularly, "gas permeable" or "permeable to gas", are to be understood to refer to that member, wall or component permitting the passage of gas therethrough at a plurality of discrete points such as spaced across the area of the particularly referred to member, wall or component.

Other objects and advantages will be apparent to those skilled in the art from the following detailed description taken in conjunction with the appended claims and drawings.

BRIEF DESCRIPTION OF THE DRAWINGS

FIG. 3 is a simplified, partially in section, schematic drawing of the airbag inflator assembly of FIG. 1 in operation, after initiation.

FIG. 4 is a simplified cross sectional view of the airbag inflator assembly of FIG. 3 taken substantially along the lines 4—4 of FIG. 3.

FIG. 8 is a simplified, partially in section, schematic drawing of the airbag inflator assembly of FIG. 7 in operation, after initiation.

FIG. 9 is a simplified cross sectional view of the airbag inflator assembly of FIG. 8 taken substantially along the lines 9—9 of FIG. 8.

FIG. 12 is a simplified, partially in section, schematic drawing of the airbag inflator assembly of FIG. 11 in operation, after initiation.

FIG. 13 is a simplified cross sectional view of the airbag inflator assembly of FIG. 12 taken substantially along the lines 13—13 of FIG. 12.

DETAILED DESCRIPTION OF THE INVENTION

Figure 1:
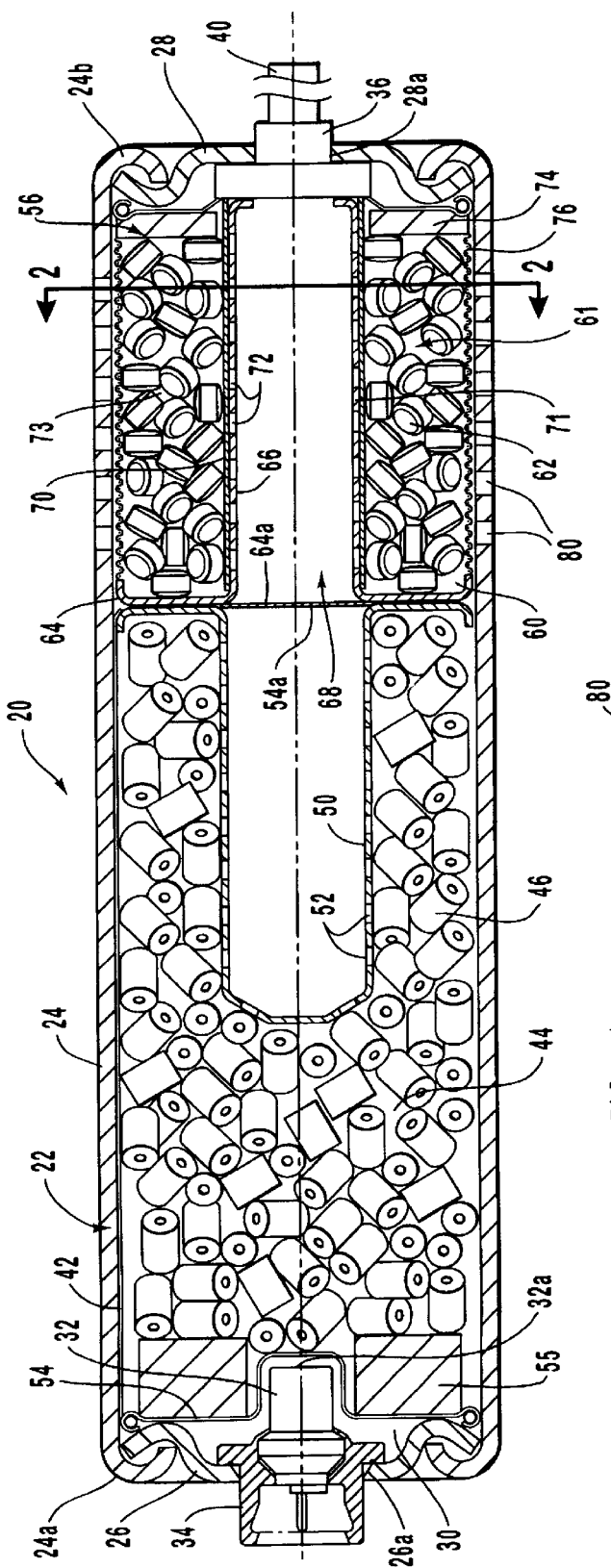
FIG. 1 is a simplified, partially in section, schematic drawing of an airbag inflator assembly in accordance with one embodiment of the invention in an at rest state.

The present invention may be embodied in a variety of different structures. Referring initially to FIGS. 1–6 and, in particular, FIGS. 1–2, there is illustrated an inflator assembly, generally designated by the reference numeral 20, in accordance with one preferred embodiment of the invention and such as may be used to inflate an inflatable vehicle occupant restraint, e.g., an inflatable airbag cushion, (not shown).

As is known and upon proper actuation, such inflatable vehicle occupant restraints are typically inflated by a flow of an inflation fluid, e.g., gas, from an inflator assembly to restrain movement of an occupant of the vehicle. In practice, it is common that inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

It is to be understood that the invention, in its broader practice, may be used or practiced in conjunction with various kinds or types of airbag assemblies including driver side, passenger side and side impact airbag assemblies. Further, the invention has applicability for use in or with airbag assemblies for not only various automotive vehicles including vans, pick-up trucks, and particularly automobiles, but also with other types of vehicles including, for example, airplanes.

The airbag inflator assembly 20 is composed of a pressure housing 22 formed by a generally elongated cylindrical sleeve or tube 24 and opposed end walls, 26 and 28, respectively. The end walls 26, 28 and the pressure housing sleeve 24 are joined together, such as in a manner known in the art such by swagging or crimping the housing tube ends 24a, 24b about the end walls 26, 28 such that the pressure housing 22 forms a chamber 30, the use of which will be described in greater detail below.

As will be appreciated, the subject invention is generally not limited by the particular construction of the pressure housing. For example, housing constructions such as composed of one or more end plates welded to a pressure sleeve or having an end which is integral or in one-piece with a housing body, such as a sleeve, can be used, if desired, in accordance with the broader practice of the invention.

The end wall 26 includes an opening 26a whereat there is joined or attached an initiator device 32, such as is known in the art, such as by means of an initiator adapter 34. The initiator device 32 includes an output end 32a extending into the chamber 30. The end wall 28 includes an opening 28a whereat there is joined or attached a base portion 36 from which extends, in a direction out of or away from the chamber 30, a mounting stud 40 such as is known in the art to facilitate desired attachment of the inflator assembly 20 such as within an associated vehicle.

The chamber 30 contains a sealed generant cartridge 42 adjacent the initiator device output end 32a such as to form a gas generating chamber 44. The generant cartridge 42 contains a quantity of gas generant grains 46, such as described in greater below, ignitable to produce, form or otherwise generate a relatively hot gas.

The generant cartridge 42 also contains a generant baffle 50 having a plurality of openings 52 to permit passage therethrough of gases generated upon combustion of the gas generant grains 46.

The generant cartridge 42 is sealed by the presence of a seal or barrier 54 about the perimeter thereof. Such a seal 54 can be variously formed of selected materials. For example, such a seal can, if desired, be formed of a material such as aluminum, copper, brass or other metal such as can be deep drawn and seamed. As will be appreciated, such seals can, if desired, take a form similar to cans such as used in food processing. As described in greater detail below, the gas generant cartridge seal 54 includes a central side portion 54a.

The gas generant grains 46 are composed of a gas generant material with an ignition enhancing coating. As a result, such inflator assembly avoids the need for the inclusion of an igniter assembly, such as is common in many common inflator assemblies. It is to be understood, however, that the broader practice of the invention is not limited to use with such ignition coated gas generant. Thus, inflator assemblies in accordance with the invention may, if desired or required, include appropriate igniter assemblies, such as is known in the art.

Further, the broader practice of the invention permits the use of various gas generant materials, such as known in the art.

Gas generant materials which can be used in the practice of the invention include azide-based gas generants such as including those which have commonly been used in airbag inflator applications. As described above, such commonly-used airbag inflator device azide pyrotechnics typically form gaseous products in a temperature range of about 1400 K to about 1500 K.

Alternatively or in addition, azide-free pyrotechnic gas generants can, if desired, be used in the practice of the invention. Further such azide-free pyrotechnic gas generants can, if desired, take the form of above-described azide-free pyrotechnic gas generants which react and burn at significantly higher temperatures than normally associated with typical azide-based gas generants such as form gaseous products at temperatures of about 1700 K to about 2500 K and, more commonly, at temperatures of about 1700 K to about 1900 K. As will be appreciated, the practice of the invention in conjunction with such higher temperature gas products and gas generants which produce such higher temperature products may be particularly desired for the reasons advanced above.

If desired and as shown, the sealed generant cartridge 42 may include a vibration damper 55, such as is known in the art. The inclusion of such a vibration damper 55 may be desired to avoid or minimize the possibly undesired vibrational effect on the inflator assembly 20 such as when such an assembly is housed within a vehicle.

The chamber 30 also contains, adjacent the sealed generant cartridge 42, a coolant cartridge 56 such as to form a coolant chamber 60. As shown, the coolant chamber 60 has the general form of an axially elongated tube.

The coolant cartridge 56 contains, in accordance with the invention, a mass of solid chemical coolant, generally designated by the reference numeral 61 and such as in the form of pellets 62. As will be appreciated, various chemical coolant materials are known and are available for use in the practice of the invention including, for example, various metallic carbonates. Magnesium carbonate is one common metallic carbonate useful in such applications. The broader practice of the invention, however, is not limited by the specific chemical coolant selected and used therein.

Moreover, it will be appreciated that, if desired, the invention can be practiced using variously shaped and sized forms of chemical coolant. For example, the chemical coolant used in the broader practice of the invention can be in the form of tablets, pellets, crystals or the like as well as various forms or shapes including various extruded forms including cylindrical perforated solids, e.g., solids which include a cylindrical bore such that the coolant solids generally tubular in shape or form similar to the gas generant grains 46 shown in FIG. 1.

Figure 2:
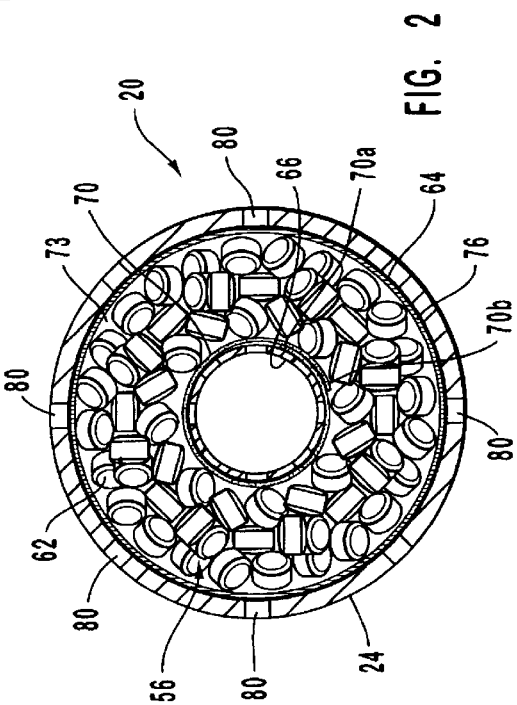
FIG. 2 is a simplified cross sectional view of the airbag inflator assembly of FIG. 1 taken substantially along the lines 2—2 of FIG. 1.

As shown in FIGS. 1 and 2, the coolant cartridge 56, similar to the above-described gas generant cartridge 42, is sealed by the presence of a seal or barrier 64 about the perimeter thereof, including a central side portion 64a. As shown, the sealed coolant cartridge 56 is adjacent and may abut the sealed gas generant cartridge 42 such that the central side portion 54a of the gas generant cartridge seal 54 and the central side portion 64a of the coolant cartridge seal 64 are aligned, as described in greater detail below, to permit flow therebetween.

The sealed coolant cartridge 56 contains a coolant baffle 66 which includes a central opening 68 adjacent the central side portion 64a of the coolant cartridge seal 64 to permit the passage therein of gases from the gas generant cartridge 42.

The coolant cartridge 56 also contains a movable permeable member 70, the use of which will be described in greater detail below, in accordance with one embodiment of the invention. The coolant baffle 66 has a generally tubular central portion 71 containing a plurality of openings 72 to permit the passage of gasses therethrough into contact with the mass of coolant 61.

The permeable member 70 is generally axially concentrically aligned with the coolant chamber tube 60 to form a generally elongated annular shaped chemical coolant storage volume 73 between the member 70 and the coolant chamber tube 60. More specifically, the movable permeable member 70 is generally in the nature of a sleeve adjacent to and surrounding the tubular central portion 71 of the coolant baffle 66. The member 70 is permeable to the generated hot gas formed upon the combustion of the gas generant 46.

In general, such a gas permeable member permits the passage of gas therethrough at a plurality of discrete points such as spaced across the area spanned thereby. As will be appreciated, such a permeable member reduces or minimizes clogging or undesired impediment of gas flow and thus desirably results in little, if any, back pressure build-up. Thus, the use of a permeable member in accordance with the invention is in sharp contradistinction to employing a member having only a single or a very limited number of gas passage points therethrough.

While a generally uniform arrangement and spacing of a plurality of uniformly shaped and sized such passage points may be preferred for use in the practice of the invention such as to improve uniformity of manufacture and operation, the broader practice of the invention is not necessarily so limited. Thus, if desired, such a permeable member composed of passage points which are either or both irregularly arranged or spaced and irregularly shaped and sized can be employed.

As a result of the permeability of the member 70, the hot gas is passed to therethrough to contact the chemical coolant solid mass 6 1. As shown, the member 70 may take the form of a perforated metal sheet rolled in an overlapping fashion to form a sleeve about the coolant baffle tubular central portion 7 1. More specifically, the member 70 includes the sheet ends 70a and 70b, which in the at rest state shown in FIG. 2, substantially overlap.

As will be described in greater detail below, the member 70 is movable to cooperate with the coolant chamber 60 such as formed by or supported by the housing 22 to maintain a compressive force on the chemical coolant as the chemical coolant endothermically reacts and the mass thereof is reduced.

If desired and as shown, the sealed coolant cartridge 56 may include a vibration damper 74 such as to avoid or minimize the possibly undesired vibrational effect on the inflator assembly 20 such as when such an assembly is housed within a vehicle.

Further, the airbag inflator assembly 20 may also include a strainer, filter member or the like, designated by the reference numeral 76, such to remove or otherwise prevent passage therethrough of larger sized particles as may possibly be entrained in the gas flow therethrough as such gas is passed from the assembly chamber 30 through a plurality of gas exit orifices 80 formed in the pressure housing sleeve 24. Such a filter member 76 may, as is shown, be contained within the sealed coolant cartridge 56. As will be appreciated, such a filter member or the like may, if included, alternatively be positioned or placed outside of the coolant cartridge such as to desirably treat the gases prior to passage into the associated airbag cushion.

The use and operation of the inflator assembly 20 will be further described below with specific reference to FIGS. 3–6.

Referring to FIGS. 3 and 4, the airbag inflator assembly 20 is shown at a point in operation, after initiation. Specifically, in operation, such as upon the sensing of a collision, an electrical signal is sent to the initiator device 32. The initiator device 32 functions to form or produce initiation reaction products which are discharged from the initiator device 32, such as from the initiator device output end 32a, and directed at or into the generant cartridge 42 to interact with the quantity of an ignition enhanced gas generant 46, resulting in the ignition thereof. The ignited enhanced gas generant reacts to produce quantities of hot gas which increase the pressure within the gas generant cartridge 42, with generated gases, represented by the arrows A shown in FIG. 3, passing through the generant baffle openings 52.

When the pressure within the sealed gas generant cartridge 42 exceeds the structural capability of the gas generant cartridge seal central side portion 54a and the coolant cartridge seal central side portion 64a, such central side portions 54a and 64a shear, rupture or otherwise permit the passage of the hot gas from the gas generant cartridge 42 into the coolant cartridge 56, through the central opening 68.

The hot gas is then passed, as represented by the arrows B shown in FIG. 3, through the coolant baffle openings 72 and then through the permeable member 70 into contact with the chemical coolant mass 61, resulting in chemical cooling thereof. The resulting cooled hot gases are then passed, as represented by the arrows C shown in FIG. 3, through the filter 76 and then out through the gas exit orifices 80 such as from the inflator assembly 20 to an associated airbag cushion.

As shown, in the subject embodiment, the gas flows in a substantially radial direction through the bed formed by the coolant mass 61. The chemical cooling realized with such an assembly is typically in the nature of the chemical coolant material endothermically reacting with the hot gas to cool the hot gas and to form at least one gaseous endothermic reaction product. As will be appreciated, the mass of the chemical coolant is typically reduced when a sufficient quantity of heat is absorbed thereby. In practice, a total reduction of about 50 percent or more of the coolant mass may be realized.

While such reduction of the chemical coolant may otherwise normally create or result in excess volume within the coolant chamber and thus permit or otherwise allow the gas to channel or flow through or past individual coolant pellets or the mass thereof without substantial interaction therewith, such possibility or likelihood is reduced or minimized by the subject invention. As identified above, the member 70 is movable to cooperate with the coolant chamber 60 to maintain a compressive force on the chemical coolant 61 as the chemical coolant endothermically reacts and the mass thereof is reduced.

Specifically, as perhaps best seen by reference to the cross sectional view of FIG. 4, the overlapping sheet forming the member 70 radially expands such as by reducing the amount or extent of overlap of the ends 70a and 70b. The expanding member 70 thus supplies or provides a consolidating force on the coolant mass 61. Consequently, the possibility or likelihood of the hot gas flowing through or past individual coolant pellets or the mass thereof without significant interaction between the hot gas and the coolant is reduced or minimized.

As shown, the damper 74 may be correspondingly compressed or otherwise constricted. Alternatively or in addition, a vibration damper 74 such as formed of fibrous paper may at least in part be consumed during such operation.

Figure 5:
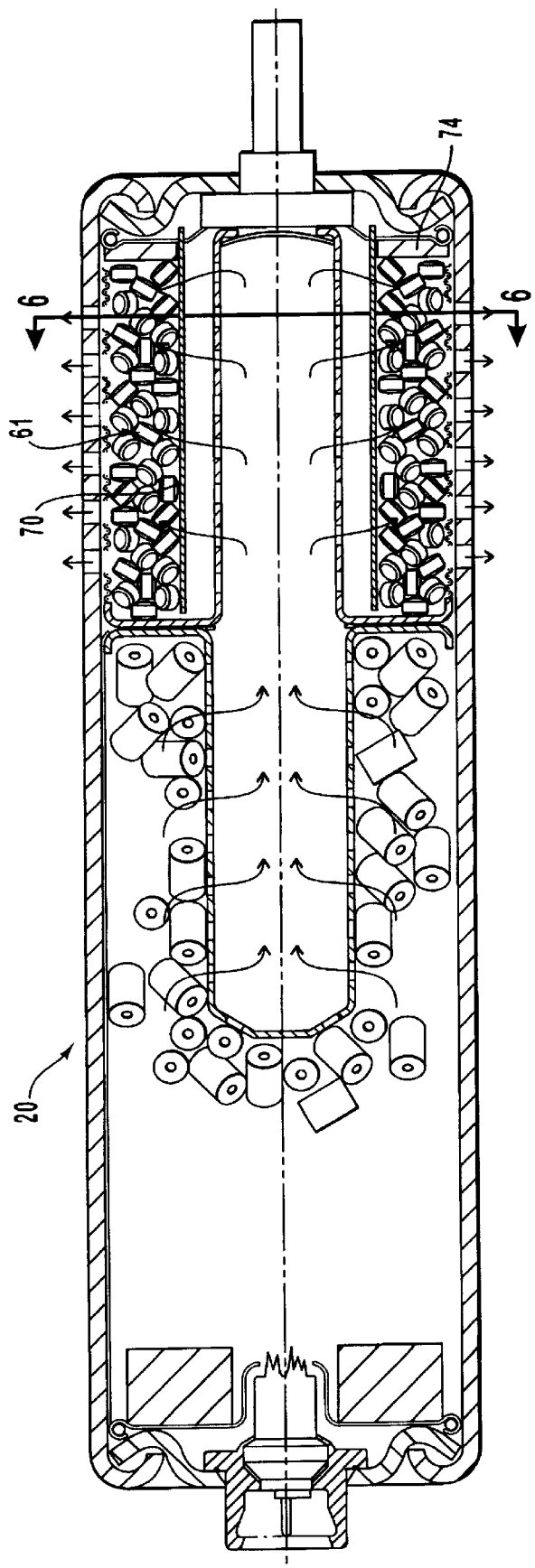
FIG. 5 is a simplified, partially in section, schematic drawing of the airbag inflator assembly of FIGS. 1 and 3 at a further stage in operation after initiation.
Figure 6:
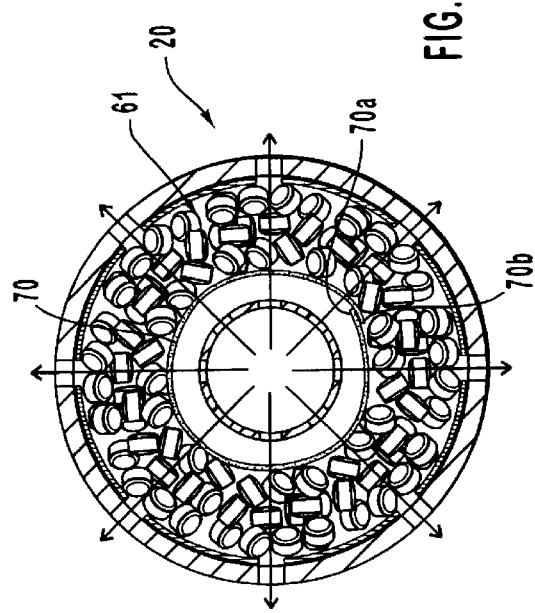
FIG. 6 is a simplified cross sectional view of the airbag inflator assembly of FIG. 5 taken substantially along the lines 6—6 of FIG. 5. to FIG. 7 is a simplified, partially in section, schematic drawing of an airbag inflator assembly in accordance with an alternative embodiment of the invention in an at rest state.

FIGS. 5 and 6 illustrate the airbag inflator assembly 20 at a further stage in operation after initiation, with a portion of the chemical coolant mass 61 having been further reduced.

As shown, the permeable member 70 has further expanded such as by reducing the amount or extent of overlap of the ends 70a and 70b. As a result, a compressive force is effectively maintained on the chemical coolant mass 61 as the chemical coolant endothermically reacts and the mass thereof is further reduced. Thus, desired interaction between the hot gas and the remaining chemical coolant is improved as the possibility or likelihood of the hot gas flowing through or past individual coolant pellets or the mass thereof without substantial interaction is reduced or minimized. Consequently, practice of the invention may permit or allow a better or more complete realization of the full potential of a given amount or volume of chemical coolant. With such improved effectiveness, the size and space requirements for corresponding inflator assemblies can desirably be reduced or minimized. As a result, the desirability of the use of such assemblies can be further enhanced.

Again, the damper 74 may be correspondingly further compressed or otherwise constricted. Alternatively or in addition, such a vibration damper 74 such as formed of fibrous paper may be further consumed during such further operation.

While the above-described embodiment incorporates and utilizes separately sealed gas generant and coolant cartridges, the broader practice of the invention is not so limited. For example, if desired, a single cartridge containing both gas generant and coolant such as otherwise similarly arranged can be used. Further, while the incorporation and use of one or more of such cartridge constructions may ordinarily simplify or facilitate either or both inflator assembly and manufacture, inflator assemblies in accordance with the invention can, if desired, be formed to contain gas generant and coolant without any such cartridge seal, such as via the direct placement of gas generant and coolant materials and associated hardware in a corresponding pressure housing.

Attention is now directed to FIGS. 7–10 which illustrate an inflator assembly, generally designated by the reference numeral 220, in accordance with an alternative embodiment of the invention and such as may also be used to inflate an inflatable vehicle occupant restraint, e.g., an inflatable airbag cushion, (not shown).

Figure 7:
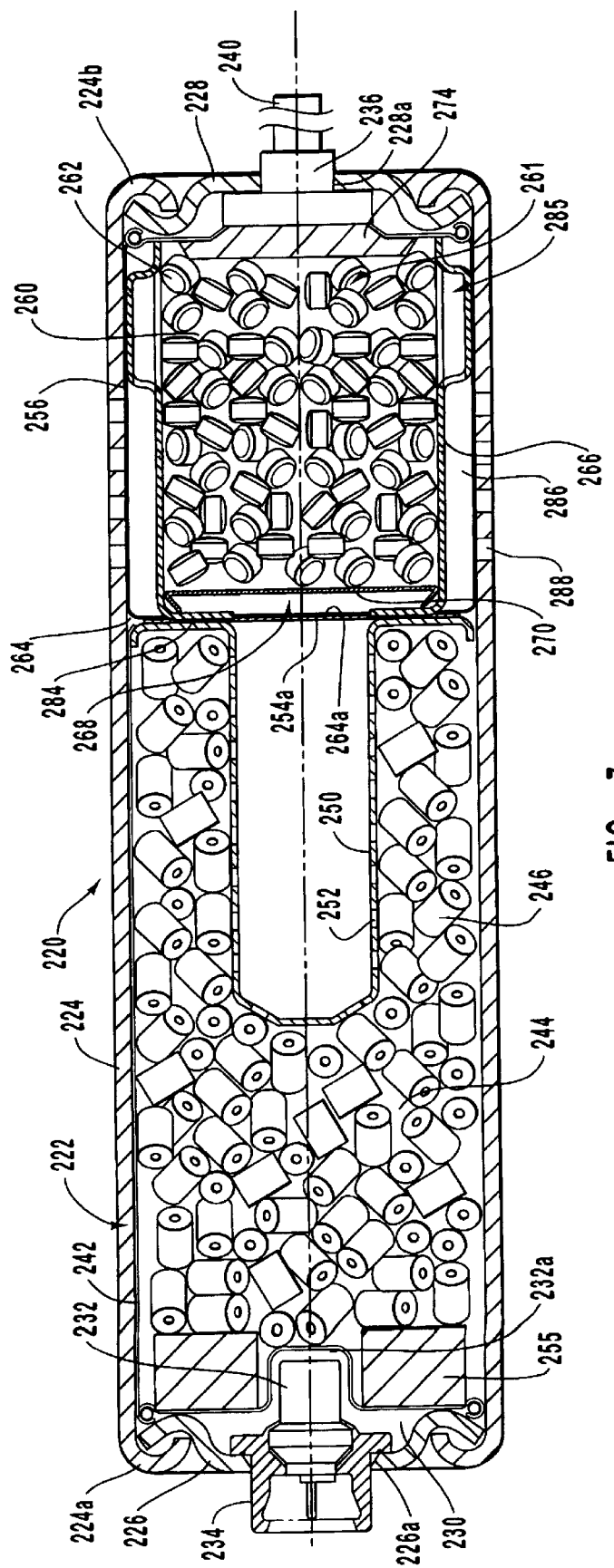

As shown in FIG. 7, the inflator assembly 220, similar to the inflator assembly 20 described above, includes a pressure housing 222 formed by a generally elongated cylindrical sleeve or tube 224 and opposed end walls, 226 and 228, respectively. The end walls 226, 228 and the pressure housing sleeve 224 are joined together, such as described above, to form a chamber 230 wherein is housed or contained a sealed generant cartridge 242 and a sealed coolant cartridge 256.

The end wall 226 includes an opening 226a whereat there is joined or attached an initiator device 232, such as is known in the art, and having an output end 232a extending into the chamber 230. The end wall 228 includes an opening 228a whereat there is joined or attached a base portion 236 from which extends, in a direction out of or away from the chamber 230, a mounting stud 240 such as is known in the art to facilitate desired attachment of the inflator assembly 220.

Adjacent the initiator device output end 232a, the chamber 230 contains the sealed generant cartridge 242 such as to form a gas generating chamber 244. The sealed generant cartridge 242 contains a quantity of gas generant grains 246, such as described above. The gas generant grains 246 are ignitable to produce, form or generate a relative hot gas. The sealed generant cartridge 242 also contains a generant baffle 250 having a plurality of openings 252 to permit passage therethrough of gases generated upon combustion of the gas generant grains 246.

The generant cartridge 242 is sealed by the presence of a seal or barrier 254, such as described above, about the perimeter thereof. As shown, the generant cartridge 242 may, as described above, include a vibration damper 255 to avoid or minimize the possibly undesired vibrational effect on the inflator assembly 220 such as when such an assembly is housed within a vehicle.

The chamber 230 contains the sealed coolant cartridge 256 adjacent the sealed generant cartridge 242 such as to form a coolant chamber 260. As shown, the coolant chamber 260 is axially elongated.

As in the above-described embodiment, the sealed coolant cartridge 256 may abut the sealed gas generant cartridge 242 such that a central side portion 254a of the gas generant cartridge seal 254 and a central side portion 264a of the coolant cartridge seal 264 are aligned in a fashion such that rupture or the opening thereof will permit flow therebetween.

The coolant cartridge 256 contains, in accordance with the invention, a solid mass 261 of a chemical coolant, such as in the form of pellets 262, such as described above. The sealed coolant cartridge 256 also includes a coolant baffle 266 and a movable permeable member 270, also sometimes referred to herein as a "compressor."

The coolant baffle 266 has the general form of a hollow cylindrical tube wherein is contained the solid mass 261 of the chemical coolant pellets 262. The coolant baffle 266 includes a narrowed neck portion 284 forming an entrance 268 wherethrough, as described in more detail below, the gases from the generant cartridge 242 are passed through into the coolant cartridge 256.

The movable permeable compressor member 270 is positioned between the entrance 268 and the chemical coolant mass 261. The compressor 270 is generally disc-shaped, in cross section. As with the member 70 in the above-described embodiment, the member 270 is permeable to the generated hot gas formed upon the combustion of the gas generant 246. As a result of such permeability, such hot gas is passed therethrough to contact the chemical coolant solid mass 261. In addition, the member 270 is movable to cooperate with the coolant chamber 260 such as formed by or supported by the housing 222 to maintain a compressive force on the chemical coolant as the chemical coolant endothermically reacts and the mass thereof is reduced. In particular, the member 270 is axially movable within the elongated coolant chamber 260.

If desired and as shown, the sealed coolant cartridge 256 may include a vibration damper 274 such as to avoid or minimize the possibly undesired vibrational effect on the inflator assembly 20 when housed within a vehicle.

The coolant baffle 266 includes a plurality of orifices or openings 285 to permit passage therethrough of gases, such as after contacting with the coolant mass 261. The coolant baffle 266 cooperates with the pressure housing sleeve 224 to form a diffusion volume 286 within the assembly 220 to receive the gases passed thereinto through the orifices 285. The cooled gas is subsequently passed through the gas exit openings 288 formed in the pressure housing sleeve 224 and such as into an associated airbag cushion, not shown.

The use and operation of the inflator assembly 220 will be further described below with specific reference to FIGS. 8–10.

Referring to FIGS. 8 and 9, the airbag inflator assembly 220 is shown at a point in operation, after initiation. Specifically, in operation, such as upon the sensing of a collision, an electrical signal is sent to the initiator device 232. The initiator device 232 functions to form or produce initiation reaction products which are discharged from the initiator device 232, such as from the initiator device output end 232a and directed at or into the generant cartridge 242 to interact with the quantity of gas generant 246, resulting in the ignition thereof. The gas generant reacts to produce quantities of hot gas which increase the pressure within the gas generant cartridge 242, with generated gases, represented by the arrows A shown in FIG. 8, passing through the generant baffle openings 252.

When the pressure within the sealed gas generant cartridge 242 exceeds the structural capability of the gas generant cartridge seal central side portion 254a and of the coolant cartridge seal central side portion 264a, such central side portions 254a and 264a rupture or otherwise permit the passage of the hot gas from the gas generant cartridge 242 into the coolant cartridge 256, through the central opening 268.

The hot gas is then passed, as represented by the arrows B shown in FIG. 8, through the permeable member 270 and into contact with the chemical coolant mass 261, resulting in chemical cooling of the hot gas. The resulting cooled hot gases are then passed, as represented by the arrows C shown in FIGS. 8 and 9, through the baffle orifices or openings 285 to the diffusion volume 286. The gases are subsequently passed, as represented by the arrows D, through the gas exit openings 288 formed in the pressure housing sleeve 224 and such as into an associated airbag cushion, not shown.

As shown, in the subject embodiment, the gas flows in a substantially axial direction through the bed formed by the coolant mass 261. As with the inflator assembly 20, described above, the chemical cooling realized with such an assembly is typically in the nature of the chemical coolant material endothermically reacting with the hot gas to cool the hot gas and to form at least one gaseous endothermic reaction product. As will be appreciated, the mass of the chemical coolant is typically reduced when a sufficient quantity of heat is absorbed thereby.

While such reduction of the chemical coolant may otherwise normally create or result in excess volume within the coolant chamber and thus permit or otherwise allow the gas to channel or flow through or past individual coolant pellets or the mass thereof without substantial interaction therewith, such possibility or likelihood is also reduced or minimized in the subject invention by the present embodiment. More specifically, the member 270 is movable to cooperate with the coolant chamber 260 such as formed by or supported by the housing 222 to maintain a compressive force on the chemical coolant as the chemical coolant endothermically reacts and the mass thereof is reduced. As shown, the gases and products of reaction resulting from reaction of the gas generant may serve to press or otherwise force the member 270 against the coolant mass 261 as such mass is correspondingly reduced.

As shown, the damper 274 may be correspondingly compressed or otherwise constricted. Alternatively or in addition, a vibration damper 274 such as formed of fibrous paper may at least in part be consumed during such operation.

Figure 10:
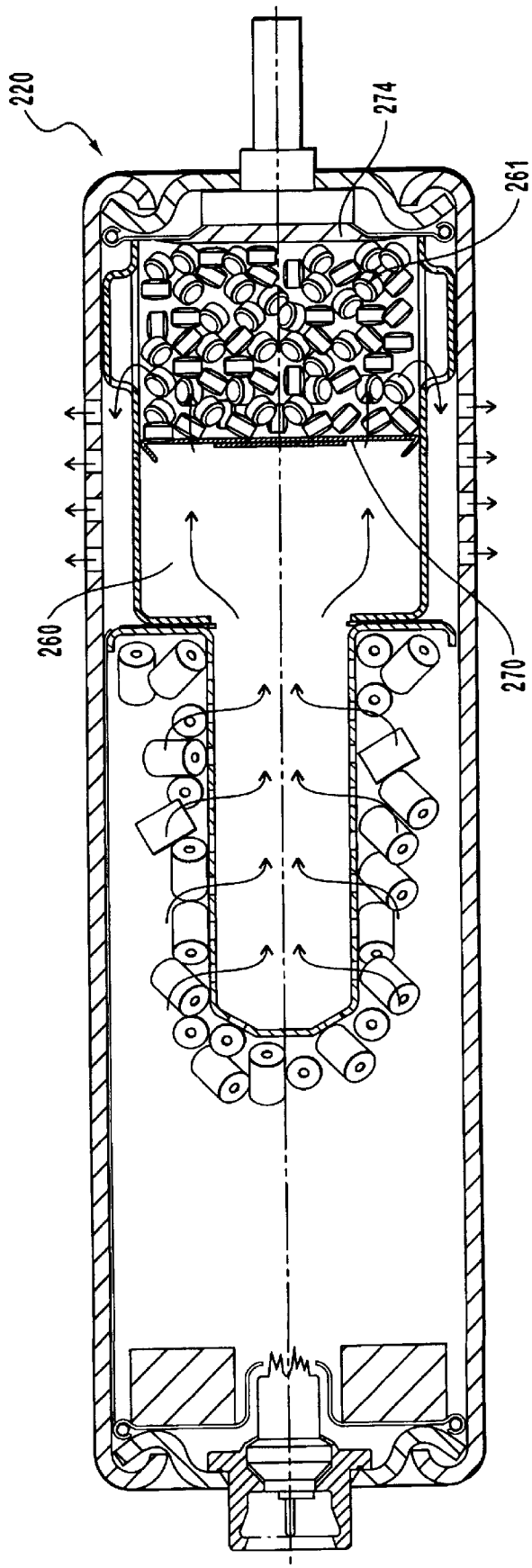
FIG. 10 is a simplified, partially in section, schematic drawing of the airbag inflator assembly of FIGS. 7 and 8 at a further stage in operation after initiation.

FIG. 10 illustrates the airbag inflator assembly 220 at a further stage in operation after initiation, with a portion of the chemical coolant mass 261 having been further reduced.

As shown, the permeable member 270 has further axially traversed the length of the coolant chamber 260 to result in the maintenance of a compressive force on the chemical coolant mass 261 as the chemical coolant endothermically reacts and the mass thereof is further reduced.

Again, the damper 274 may be correspondingly further compressed or otherwise constricted. Alternatively or in addition, such a vibration damper 274 such as formed of fibrous paper may be further consumed during such further operation.

In a preferred practice of the invention, the seal central side portions 254a and 264a, respectively, are consumed upon extended contact with the hot gases produced with the combustion of the gas generant 246. Thus, such side portions 254a and 264a are not shown in FIG. 10.

Attention is now directed to FIGS. 11–14 which illustrate an inflator assembly, generally designated by the reference numeral 320, in accordance with another alternative embodiment of the invention. As described in greater detail below, the inflator assembly 320 is in many respects similar to the above-described inflator assembly 220 and, like the above-described inflator assemblies, may also be used to inflate an inflatable vehicle occupant restraint, e.g., an inflatable airbag cushion.

Figure 11:
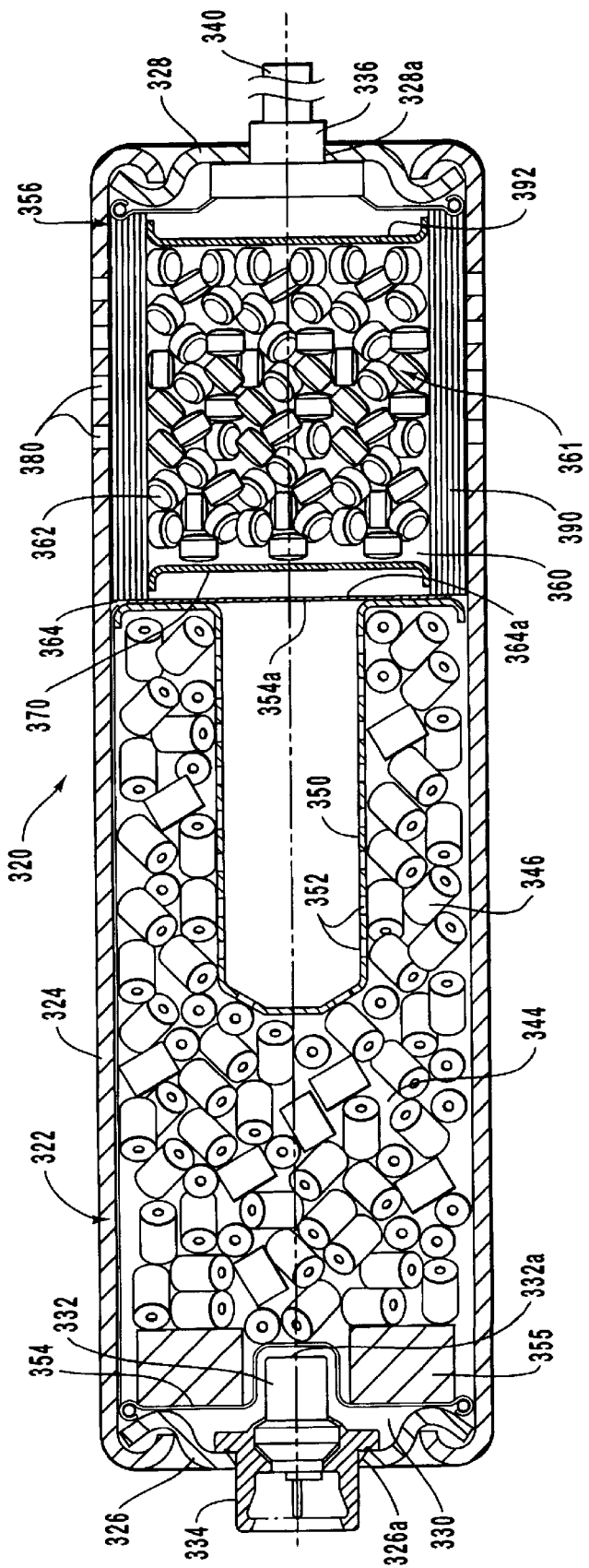
FIG. 11 is a simplified, partially in section, schematic drawing of an airbag inflator assembly in accordance with another alternative embodiment of the invention in an at rest state.

As shown in FIG. 11 the inflator assembly 320, similar to the inflator assembly 220 described above, includes a pressure housing 322 formed by a generally elongated cylindrical sleeve or tube 324 and opposed end walls, 326 and 328, respectively. The end walls 326, 328 and the pressure housing sleeve 324 are joined together, such as described above, to form a chamber 330 wherein is housed or contained a sealed generant cartridge 342 and a sealed coolant cartridge 356.

The end wall 326 includes an opening 326a whereat there is joined or attached an initiator device 332, such as is known in the art, and having an output end 332a extending into the chamber 330. The end wall 328 includes an opening 328a whereat there is joined or attached a base portion 336 from which extends, in a direction out of or away from the chamber 330, a mounting stud 340 such as is known in the art to facilitate desired attachment of the inflator assembly 320.

Adjacent the initiator device output end 332a, the chamber 330 contains the sealed generant cartridge 342 such as to form a gas generating chamber 344. The sealed generant cartridge 342 contains a quantity of gas generant grains 346, such as described above. The gas generant grains 346 are ignitable to produce, form or generate a relatively hot gas. The sealed generant cartridge 342 also contains a generant baffle 350 having a plurality of openings 352 to permit passage therethrough of gases generated upon combustion of the gas generant grains 346.

The generant cartridge 342 is sealed by the presence of a seal or barrier 354, such as described above, about the perimeter thereof. As shown, the generant cartridge 342 may, as described above, include a vibration damper 355 to avoid or minimize the possibly undesired vibrational effect on the inflator assembly 320 such as when such an assembly is housed within a vehicle.

The chamber 330 contains the sealed coolant cartridge 356 adjacent the sealed generant cartridge 342 such as to form a coolant chamber 360. As shown, the coolant chamber 360 is axially elongated.

As in the above-described embodiment, the sealed coolant cartridge 356 may abut the sealed gas generant cartridge 342 such that a central side portion 354a of the gas generant cartridge seal 354 and a central side portion 364a of the coolant cartridge seal 364 are aligned in a fashion such that rupture or the opening thereof will permit flow therebetween.

The coolant cartridge 356 contains, in accordance with the invention, a solid mass 361 of a chemical coolant, such as in the form of pellets 362, such as described above. The sealed coolant cartridge 356 contains or includes a coolant strainer 390 such as in the form of a hollow cylindrical tube. The solid mass 361 of the chemical coolant pellets 362 is contained or held within the coolant strainer 390 by means of a back plate 392 and a movable permeable member 370, also sometimes referred to herein as a "compressor", such as described above.

As will be appreciated, such a coolant strainer for use in the practice of the invention can be variously composed, as may be desired. In accordance with one embodiment, the coolant strainer is composed of a multiple layer wrap of an expanded metal or the like.

In the at rest state, the movable permeable compressor member 370 is positioned between the coolant cartridge seal central side portion 364a and the chemical coolant mass 361. The compressor 370 is generally disc-shaped, in cross section. As with the member 270 in the above-described embodiment, the member 370 is permeable to the generated hot gas formed upon the combustion of the gas generant 346. As a result of such permeability, such hot gas is passed therethrough to contact the chemical coolant solid mass 361. In addition, the member 370 is movable to cooperate with the coolant chamber 360 such as formed by the coolant strainer 390 supported by the housing 322 to maintain a compressive force on the chemical coolant as the chemical coolant endothermically reacts and the mass thereof is reduced. In particular, the member 370 is axially movable within the elongated coolant chamber 360.

A plurality of gas exit orifices 380 are formed in the pressure housing sleeve 324 to permit passage of the resulting cooled gases from the assembly 320 and such as into an associated airbag cushion (not shown).

The use and operation of the inflator assembly 320 will be further described below with specific reference to FIGS. 12–14.

Referring to FIGS. 12 and 13, the airbag inflator assembly 320 is shown at a point in operation, after initiation. Specifically, in operation, such as upon the sensing of a collision, an electrical signal is sent to the initiator device 332. The initiator device 332 functions to form or produce initiation reaction products which are discharged from the initiator device 332, such as from the initiator device output end 332a and directed at or into the generant cartridge 342 to interact with the quantity of gas generant 346, resulting in the ignition thereof. The gas generant reacts to produce quantities of hot gas which increase the pressure within the gas generant cartridge 342, with generated gases, represented by the arrows A shown in FIG. 12, passing through the generant baffle openings 352.

When the pressure within the sealed gas generant cartridge 342 exceeds the structural capability of the gas generant cartridge seal central side portion 354a and of the coolant cartridge seal central side portion 364a, such central side portions 354a and 364a rupture or otherwise permit the passage of the hot gas from the gas generant cartridge 342 into the coolant cartridge 356.

The hot gas is then passed, as represented by the arrows B shown in FIG. 12, through the permeable member 370 and into contact with the chemical coolant mass 361, resulting in chemical cooling of the hot gas. The resulting cooled hot gases are then passed through the gas permeable coolant strainer 390 and out the gas exit orifices or openings 380, as represented by the arrows C shown in FIGS. 12 and 13.

As shown and as generally similar to the above-described embodiment illustrated in FIGS. 7–10, the gas flows in a substantially axial direction through the bed formed by the coolant mass 361. As with the above-described embodiments, the chemical cooling realized with such an assembly is typically in the nature of the chemical coolant material endothermically reacting with the hot gas to cool the hot gas and to form at least one gaseous endothermic reaction product. As will be appreciated, the mass of the chemical coolant is typically reduced when a sufficient quantity of heat is absorbed thereby.

While such reduction of the chemical coolant may otherwise normally create or result in excess volume within the coolant chamber and thus permit or otherwise allow the gas to channel or flow through or past individual coolant pellets or the mass thereof without substantial interaction therewith, such possibility or likelihood is also reduced or minimized in the subject invention by the present embodiment. More specifically, the member 370 is movable to cooperate with the coolant chamber 360 such as formed by the coolant strainer 390 supported by the housing 322 to maintain a compressive force on the chemical coolant as the chemical coolant endothermically reacts and the mass thereof is reduced. As shown, the gases and products of reaction resulting from reaction of the gas generant may serve to press or otherwise force the member 370 against the coolant mass 361 as such mass is correspondingly reduced.

Figure 14:
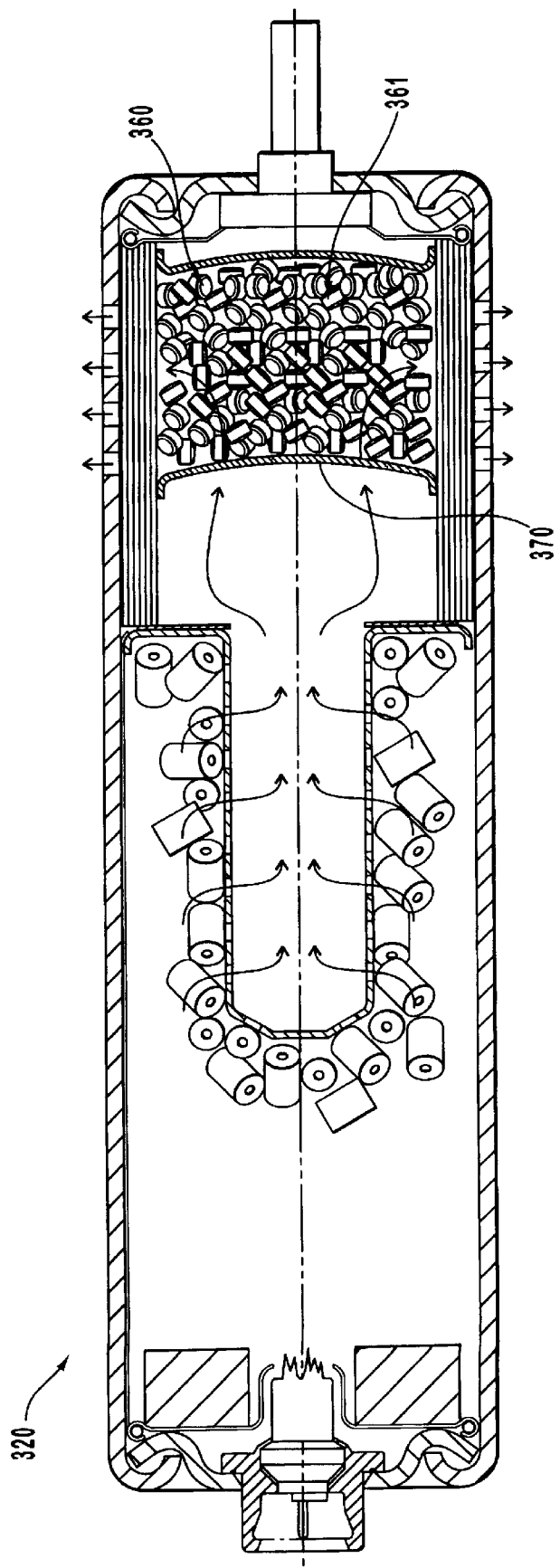
FIG. 14 is a simplified, partially in section, schematic drawing of the airbag inflator assembly of FIGS. 11 and 12 at a further stage in operation after initiation.

FIG. 14 illustrates the airbag inflator assembly 320 at a further stage in operation after initiation, with a portion of the chemical coolant mass 361 having been further reduced.

As shown, the permeable member 370 has further axially traversed the length of the coolant chamber 360 to result in the maintenance of a compressive force on the chemical coolant mass 361 as the chemical coolant endothermically reacts and the mass thereof is further reduced.

It will be appreciated that the same or similar chemical coolant materials, having the same or similar shapes and forms, can appropriately be utilized in the practice of the various embodiments of the invention. In practice, however, it may be desired to employ coarser or larger coolant particles in those particular embodiments wherein the gas being treated is required to pass through a coolant mass of increased thickness such as to facilitate the required flow.

Thus, axial flow configurations such as illustrated in the above-described inflator assemblies 220 and 320 may preferentially employ coolant particles which are typically larger or more coarse, as compared to the above-described radial flow inflator assembly 20.

As will be appreciated, the particular permeable member structure employed in the practice of the invention can be variously embodied. Particular permeable member structures include expanded or perforated metals, for example. One particularly preferred permeable member structure such as for use in the practice of the above-described axial flow embodiments of the invention, is composed of a perforated metal sheet having a thickness of about 0.030 to about 0.032 inch and including a plurality of uniformly spaced holes of about 0.07 diameter resulting in the member being about 50% or more open. A permeable member structure having about 10 to about 20 percent open area in the form of an expanded metal which has been flattened by being calendered has been found useful in the above-described radial flow embodiment.

While the invention has been described above in relation to an assembly for cooling a gas as a part of an airbag inflator assembly, the invention is not necessarily so limited. As will be appreciated, such gas cooling assemblies can, if desired, be employed in other contexts wherein such treatment of a relatively hot gas is desired or required.

Thus, the invention generally provides improved assemblies and methods for cooling a hot gas, as well as improved inflator assemblies. In particular, the invention provides an assembly and processing technique alternative to mechanical cooling of gases of improved efficiency and effectiveness and which may permit either or both the more widespread or efficient use of chemical coolants such as by minimizing or avoiding the possibly detrimental effects of size reduction or gas passage channel formation such as commonly associated with the use of a body of such a chemical coolant.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An assembly for use in cooling a hot gas, said assembly comprising:

an axially elongated coolant chamber containing a mass of a chemical coolant solid, said coolant chamber including at least one gas entrance opening and a plurality of radially distributed gas exit orifices, the chemical coolant being endothermically reactable with the hot gas to cool the hot gas and to form at least one gaseous endothermic reaction product, the mass of the chemical coolant solid being reduced when a sufficient quantity of heat is absorbed thereby, and a member interposed between the at least one gas entrance opening and the mass of chemical coolant, said member being permeable to the hot gas to permit passage of the hot gas therethrough to contact the chemical coolant, said member also being movable to cooperate with said coolant chamber to maintain a compressive force on the chemical coolant as the chemical coolant endothermically reacts and the mass thereof is reduced, with the cooled hot gas passing from said coolant chamber through the radially distributed gas exit orifices.

2. The assembly of claim 1 wherein said coolant chamber is axially elongated and said member is disc-shaped and axially movable within the elongated coolant chamber.

3. The assembly of claim 2 wherein said coolant chamber includes a wall portion comprising a gas permeable material.

4. The assembly of claim 1 wherein said permeable member comprises a plurality of discrete points for the passage of gas therethrough.

5. An assembly for use in cooling a hot gas, said assembly comprising:

a coolant chamber containing a mass of a chemical coolant solid, said coolant chamber including at least one gas entrance opening and at least one gas exit orifice, the chemical coolant being endothermically reactable with the hot gas to cool the hot gas and to form at least one gaseous endothermic reaction product, the mass of the chemical coolant solid being reduced when a sufficient quantity of heat is absorbed thereby, and a member interposed between the at least one gas entrance opening and the mass of chemical coolant, said member being permeable to the hot gas to permit passage of the hot gas therethrough to contact the chemical coolant, said member also being movable to cooperate with said coolant chamber to maintain a compressive force on the chemical coolant as the chemical coolant endothermically reacts and the mass thereof is reduced, with the cooled hot gas passing from said coolant chamber through the at least one gas exit orifice, wherein said coolant chamber is in the form of an axially elongated tube and said member is axially concentrically aligned with the tube to form an elongated annular chemical coolant storage volume between said member and the tube.

6. The assembly of claim 5 wherein said member comprises a sleeve that radially expands to maintain a compressive force on the chemical coolant as the chemical coolant endothermically reacts and the mass thereof is reduced.

7. The assembly of claim 6 wherein said sleeve comprises an overlapping rolled up perforated metal sheet.

8. An inflator assembly comprising:

a gas generating chamber wherein a hot gas is generated, said gas generating chamber having at least one gas exit opening and, upon actuation, said gas generating chamber emitting generated hot gas through the at least one gas exit opening; and a chemical coolant assembly in fluid communication with the generated hot gas emitted from said gas generating chamber, said chemical coolant assembly including an axially elongated coolant chamber containing a mass of a chemical coolant solid and including at least one gas entrance opening and a plurality of radially distributed gas exit orifices, the chemical coolant being endothermically reactable with the generated hot gas to cool the generated hot gas and to form at least one gaseous endothermic reaction product, the mass of the chemical coolant being reduced when a sufficient quantity of heat is absorbed thereby, said chemical coolant assembly also including a member interposed between the at least one gas entrance opening and the chemical coolant, the member being permeable to the generated hot gas to permit passage of the generated hot gas therethrough to contact the chemical coolant, the member also being movable to cooperate with the coolant chamber to maintain a compressive force on the chemical coolant as the chemical coolant endothermically reacts and the mass thereof is reduced, with the cooled generated hot gas passing from the coolant chamber through the radially distributed gas exit orifices.

9. The assembly of claim 8 wherein said coolant chamber is axially elongated and said member is disc-shaped and axially movable within the elongated coolant chamber.

10. The assembly of claim 9 wherein said coolant chamber includes a wall portion comprising a gas permeable material.

11. The assembly of claim 8 wherein said permeable member comprises a plurality of discrete points for the passage of gas therethrough.

12. An inflator assembly comprising:

a gas generating chamber wherein a hot gas is generated, said gas generating chamber having at least one gas exit opening and, upon actuation, said gas generating chamber emitting generated hot gas through the at least one gas exit opening; and a chemical coolant assembly in fluid communication with the generated hot gas emitted from said gas generating chamber, said chemical coolant assembly including a coolant chamber containing a mass of a chemical coolant solid and including at least one gas entrance opening and at least one gas exit orifice, the chemical coolant being endothermically reactable with the generated hot gas to cool the generated hot gas and to form at least one gaseous endothermic reaction product, the mass of the chemical coolant being reduced when a sufficient quantity of heat is absorbed thereby, said chemical coolant assembly also including a member interposed between the at least one gas entrance opening and the chemical coolant, the member being permeable to the generated hot gas to permit passage of the generated hot gas therethrough to contact the chemical coolant, the member also being movable to cooperate with the coolant chamber to maintain a compressive force on the chemical coolant as the chemical coolant endothermically reacts and the mass thereof is reduced, with the cooled generated hot gas passing from the coolant chamber through the at least one gas exit orifice, wherein said coolant chamber is in the form of an axially elongated tube and said member is axially concentrically aligned with the tube to form an elongated annular chemical coolant storage volume between said member and the tube.

13. The assembly of claim 12 wherein said member comprises a sleeve that radially expands to maintain a compressive force on the chemical coolant as the chemical coolant endothermically reacts and the mass thereof is reduced.

14. The assembly of claim 13 wherein said sleeve comprises an overlapping rolled up perforated metal sheet.

15. A method of providing a cooled gas, said method comprising the steps of:

passing a quantity of hot gas through a permeable member and into contact with a mass of a chemical coolant solid contained within an axially elongated coolant chamber and which coolant chamber includes a plurality of radially distributed gas exit orifices, the chemical coolant solid being endothermically reactable with the hot gas to cool the hot gas and to form at least one gaseous endothermic reaction product, the size of the mass of the chemical coolant being reduced when a sufficient quantity of heat is absorbed thereby, compressing the chemical coolant between the movable member and the coolant chamber as the size of the chemical coolant solid mass is reduced, and discharging a quantity of the cooled gas from the coolant chamber through the radially distributed gas exit orifices.

16. A method of inflating an airbag cushion, said method comprising:

generating a hot gas, cooling the hot gas by the method of claim 15 and passing the cooled hot gas into the airbag cushion.

17. The method of claim 15 wherein the coolant chamber is axially elongated and said compressing step comprises axially moving the movable member within the coolant chamber.

18. A method of inflating an airbag cushion, said method comprising:

generating a hot gas, cooling the hot gas by the method of claim 17 and passing the cooled hot gas into the airbag cushion.

19. A method of cooling a hot gas, said method comprising the steps of:

passing a quantity of hot gas through a permeable member and into contact with a mass of a chemical coolant solid contained within a coolant chamber, the chemical coolant being endothermically reactable with the hot gas to cool the hot gas and to form at least one gaseous endothermic reaction product, the size of the mass of the chemical coolant being reduced when a sufficient quantity of heat is absorbed thereby, and compressing the chemical coolant between the movable member and the coolant chamber as the size of the chemical coolant solid mass is reduced, wherein the coolant chamber is axially elongated and said compressing step comprises radially expanding the movable member within the coolant chamber.

20. A method of inflating an airbag cushion, said method comprising:

generating a hot gas, cooling the hot gas by the method of claim 19 and passing the cooled hot gas into the airbag cushion.

* * * * *